US011055437B2

(12) United States Patent
Kalva et al.

(10) Patent No.: US 11,055,437 B2
(45) Date of Patent: Jul. 6, 2021

(54) SYSTEMS AND METHODS FOR ENSURING PRIVACY IN ONLINE INFORMATION SHARING APPLICATIONS

(71) Applicant: Florida Atlantic University Board of Trustees, Boca Raton, FL (US)

(72) Inventors: Hari Kalva, Delray Beach, FL (US); Neha Kommireddy, Kampala (UG)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 323 days.

(21) Appl. No.: 16/264,921

(22) Filed: Feb. 1, 2019

(65) Prior Publication Data
US 2019/0243989 A1 Aug. 8, 2019

Related U.S. Application Data

(60) Provisional application No. 62/625,606, filed on Feb. 2, 2018.

(51) Int. Cl.
*H04L 29/06* (2006.01)
*G06F 21/62* (2013.01)
*G06F 21/60* (2013.01)
*G06F 21/32* (2013.01)

(52) U.S. Cl.
CPC .......... *G06F 21/6263* (2013.01); *G06F 21/32* (2013.01); *G06F 21/604* (2013.01); *H04L 63/101* (2013.01); *H04L 63/107* (2013.01)

(58) Field of Classification Search
CPC .... G06F 21/6263; G06F 21/32; G06F 21/604; H04L 63/101; H04L 63/107
See application file for complete search history.

(56) References Cited

U.S. PATENT DOCUMENTS

| 8,074,083 | B1 * | 12/2011 | Lee | G06F 21/10 713/194 |
| 8,392,941 | B2 * | 3/2013 | Nagai | H04N 21/4542 725/28 |
| 8,856,818 | B2 * | 10/2014 | Emerson | H04N 7/17318 725/25 |
| 8,898,743 | B1 * | 11/2014 | Kowalik | H04W 12/08 726/4 |
| 8,904,164 | B2 * | 12/2014 | Ferren | H04N 5/23212 713/100 |
| 2005/0119967 | A1 * | 6/2005 | Ishiguro | G06Q 40/025 705/38 |
| 2006/0021057 | A1 * | 1/2006 | Risan | G06F 21/10 726/26 |

(Continued)

Primary Examiner — Sarah Su
(74) Attorney, Agent, or Firm — Fox Rothschild LLP

(57) ABSTRACT

Systems and methods for restricting a first computing device's output of information. The methods comprise: receiving, at the first computing device, information and at least one viewing restriction set for the information; collecting situational awareness information by the first computing device; using the situational awareness information to determine if the at least one viewing restriction is satisfied; and displaying the information on a screen of the first computing device if a determination is made that the at least one viewing restriction is satisfied or preventing the displaying of the information if a determination is made that the at least one viewing restriction is not satisfied.

24 Claims, 9 Drawing Sheets

(56) References Cited

U.S. PATENT DOCUMENTS

| | | | | |
|---|---|---|---|---|
| 2007/0094145 | A1* | 4/2007 | Ta | G06Q 30/06 705/59 |
| 2007/0214475 | A1* | 9/2007 | Lee | H04N 21/84 725/31 |
| 2010/0192233 | A1* | 7/2010 | Tanikawa | G11B 20/00181 726/28 |
| 2010/0319053 | A1* | 12/2010 | Gharabally | G06Q 10/10 726/4 |
| 2013/0160111 | A1* | 6/2013 | Orr | G06F 21/32 726/19 |
| 2013/0179544 | A1* | 7/2013 | Sainnsbury | H04W 4/021 709/219 |
| 2014/0198958 | A1* | 7/2014 | Nathan | G06F 21/6245 382/116 |
| 2015/0081412 | A1* | 3/2015 | Suzuki | G06Q 30/0222 705/14.23 |
| 2016/0359816 | A1* | 12/2016 | Vedula | H04L 65/60 |
| 2017/0017777 | A1* | 1/2017 | Manago | G06F 3/0655 |
| 2018/0096158 | A1* | 4/2018 | Murphy | H04L 9/3213 |
| 2018/0124443 | A1* | 5/2018 | Chow | H04N 7/1675 |
| 2018/0248891 | A1* | 8/2018 | Tamma | H04L 67/18 |
| 2018/0365436 | A1* | 12/2018 | Shitrit | G06F 21/62 |
| 2018/0367552 | A1* | 12/2018 | Burriesci | G06F 21/6209 |
| 2018/0374048 | A1* | 12/2018 | Minami | G06Q 10/10 |
| 2018/0375874 | A1* | 12/2018 | Musik | H04L 63/0861 |
| 2019/0171795 | A1* | 6/2019 | Seetharam | G06F 21/10 |
| 2019/0207995 | A1* | 7/2019 | Gonzales, Jr. | G06F 16/1805 |
| 2021/0034725 | A1* | 2/2021 | Donley | G06F 21/32 |

\* cited by examiner

SYSTEMS AND METHODS FOR ENSURING PRIVACY IN ONLINE INFORMATION SHARING APPLICATIONS

CROSS-REFERENCE TO RELATED APPLICATIONS

The present application claims the benefit of U.S. patent application Ser. No. 62/625,606 filed on Feb. 2, 2018. This patent application is hereby incorporated by reference in its entirety.

BACKGROUND

Statement of the Technical Field

The present disclosure relates generally to computing systems. More particularly, the present disclosure relates to systems and methods for ensuring privacy in online information sharing applications.

Description of the Related Art

When information is exchanged over the internet, senders are not certain of who gains access to the information that is sent. This can be very important for confidential documents, pictures, and messages.

Senders have little to no control over who views the information that is being sent and where it is being viewed. Many people may be reluctant to send sensitive information over the internet due to lack of control. This problem is apparent when individuals share pictures online or when organizations share confidential documents with employees and partners. While services such as SnapChat allow self-destructing messages or messages that are available for a short duration of time, there is no way to prevent photographing the screen on which such limited access photos or documents are displayed.

SUMMARY

The present disclosure concerns implementing systems and methods for restricting a first computing device's output of information. The methods comprise: receiving, at the first computing device, information and at least one viewing restriction set for the information; collecting situational awareness information by the first computing device; using the situational awareness information to determine if the at least one viewing restriction is satisfied; and displaying the information on a screen of the first computing device if a determination is made that the at least one viewing restriction is satisfied or preventing the displaying of the information if a determination is made that the at least one viewing restriction is not satisfied. In some scenarios, the information includes audio and is played or recorded on the second computing device.

The viewing restriction is set based on pre-defined viewing restrictions or a user input of a second computing device. The viewing restriction includes, but is not limited to, (1) a number of people that can view information, (2) a maximum number of people that can view the information, (3) specific people that can view the information, (4) specific people that should not view the information, (5) a specific set of people that must view the information together, (6) a specific location where the information can be viewed, (7) no external recordings of the information, (8) no external display of the information, and/or (9) record situational awareness information while the information is being viewed.

A determination can be made that the at least one viewing restriction is satisfied when: a number of individuals specified by results of an image, video, audio recording, and/or biometric information analysis is equal to or less than a number of people specified by the at least one viewing restriction; each individuals identity specified by results of an image, video, audio recording or biometric information analysis matches a person's identity specified by the at least one viewing restriction or a list associated with the at least one viewing restriction; each individuals identity specified by results of an image, video, audio recording or biometric information analysis does not match a person's identity specified by a list of people who should not view information; a set of individuals identified via an analysis of image(s), video(s) or audio recording(s) matches a set of individuals specified by the at least one viewing restriction; a geographic location or area specified by location information for the first computing device matches a geographic location or area specified by the at least one viewing restriction; results of image or video analysis indicates that there are no target objects in a surrounding environment of the first computing device; the first computing device detects that external projection or display sharing mechanisms are disabled; and/or at least one recording device of the first computing device is enabled and usable.

The situational awareness information includes, but is not limited to, information contained in a captured image, information contained in a captured video, information contained in an audio recording, information specifying the first computing device's location, and/or biometric information for a user of the first computing device.

In some scenarios, the methods also comprise: communicating a request for removing the at least one restriction from the first computing device to a second computing device that is a source of the information; and selectively removing the at least one restriction in accordance with a sender's instructions provided from the second computing device. The instructions are generated by the sender based on the situational awareness information output from the first computing device and/or the second computing device that is remote from the first computing device. The information is displayed on a screen of the first computing device when the at least one viewing restriction is removed.

BRIEF DESCRIPTION OF THE DRAWINGS

The present solution will be described with reference to the following drawing figures, in which like numerals represent like items throughout the figures.

DETAILED DESCRIPTION

Figure 1:
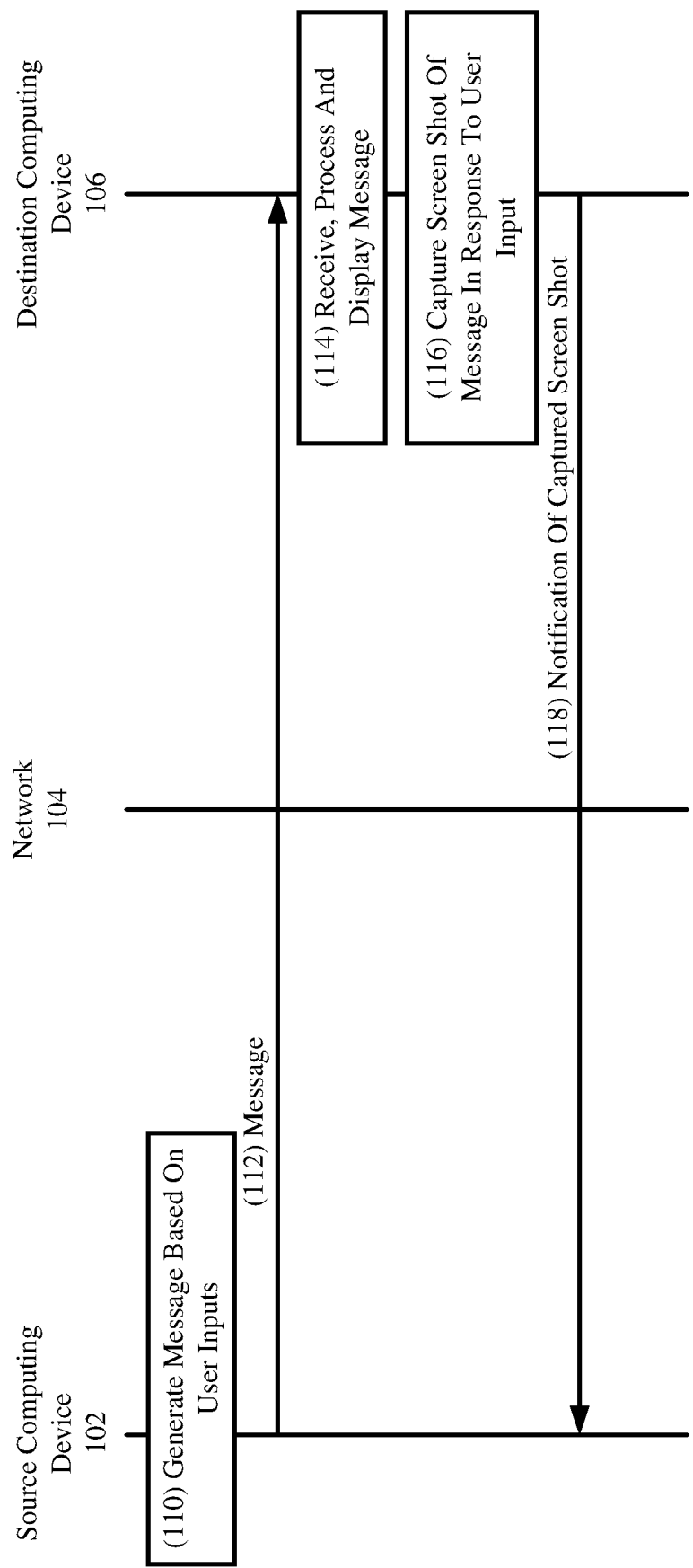
FIG. 1 is a message flow for a conventional system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

There is a need for a system that ensures maximum privacy for document sharing that overcomes the problems of conventional systems. The present solution provides such a system. Accordingly, the present solution provides ways to control how and when shared documents are displayed. In this regard, new control mechanisms are provided that limit opportunities for capturing information displayed on screens using an external capture device such as a camera. The present solution also provides a way to restrict how and when shared documents are displayed and to prevent unauthorized individuals from having access to the documents.

The present solution (1) helps users protect sensitive information sent electronically between devices (e.g., over the Internet) and (2) ensures that only the intended audience can view the information that has been sent. Feature (1) is accomplished by encrypting information (e.g., messages) to be sent electronically to one or more remote devices (e.g., over the Internet). Feature (2) is accomplished by detecting a number of people that are viewing a display of a destination computing device, and sending a picture of these people to a source computing device. The user of the source computing device will view the picture and confirm that the user(s) of the destination computing device can have access to the information at issue. In some scenarios, the source computing device is also provided with a location of the destination computing device and/or an audio file including sound in a surrounding environment of the destination computing device. Once the environment has been deemed appropriate, the destination computing device is provided access to decryption keys. The encrypted information is then decrypted and displayed on a display screen of the destination computing device.

The present solution will be described below in relation to scenarios that involve message exchange in social networks. The present solution is not limited in this regard, and can be used in many other applications such as document security applications. For example, defense and intelligence agencies can place more precise restrictions on how documents are viewed by implementing the present solution.

Illustrative Systems

Referring now to FIG. 1, there is provided an illustration that is useful for understanding how a conventional system (e.g., SnapChat based system) operates. As shown in block 110 of FIG. 1, a source computing device 102 (e.g., a smart phone) generates a message based on user inputs. The message includes, but is not limited to, text, images and/or documents. The message is sent from the source computing device 102 to a destination computing device 106 via a network 104 (e.g., the Internet or Intranet), as shown by arrow 112. In block 114, the message is received, processed and displayed by the destination computing device 106. Next in 116, the destination computing device 106 captures a screen shot of the message in response to a user. The destination computing device 106 notifies the source computing device 102 in 118 about the captured screen shot.

Although the source computing device is provided notice of screens shot captures, the conventional system is absent of any means to prevent a user of the destination computing device from showing the displayed message to other people, to prevent an external camera from capturing an image of the displayed message, to prevent sharing of the captured image with others, and/or to provide notification to a sender about the image capture and sharing.

The present solution addresses these drawbacks of the conventional system. The present solution will now be described in relation to FIGS. 2-7.

Figure 2:
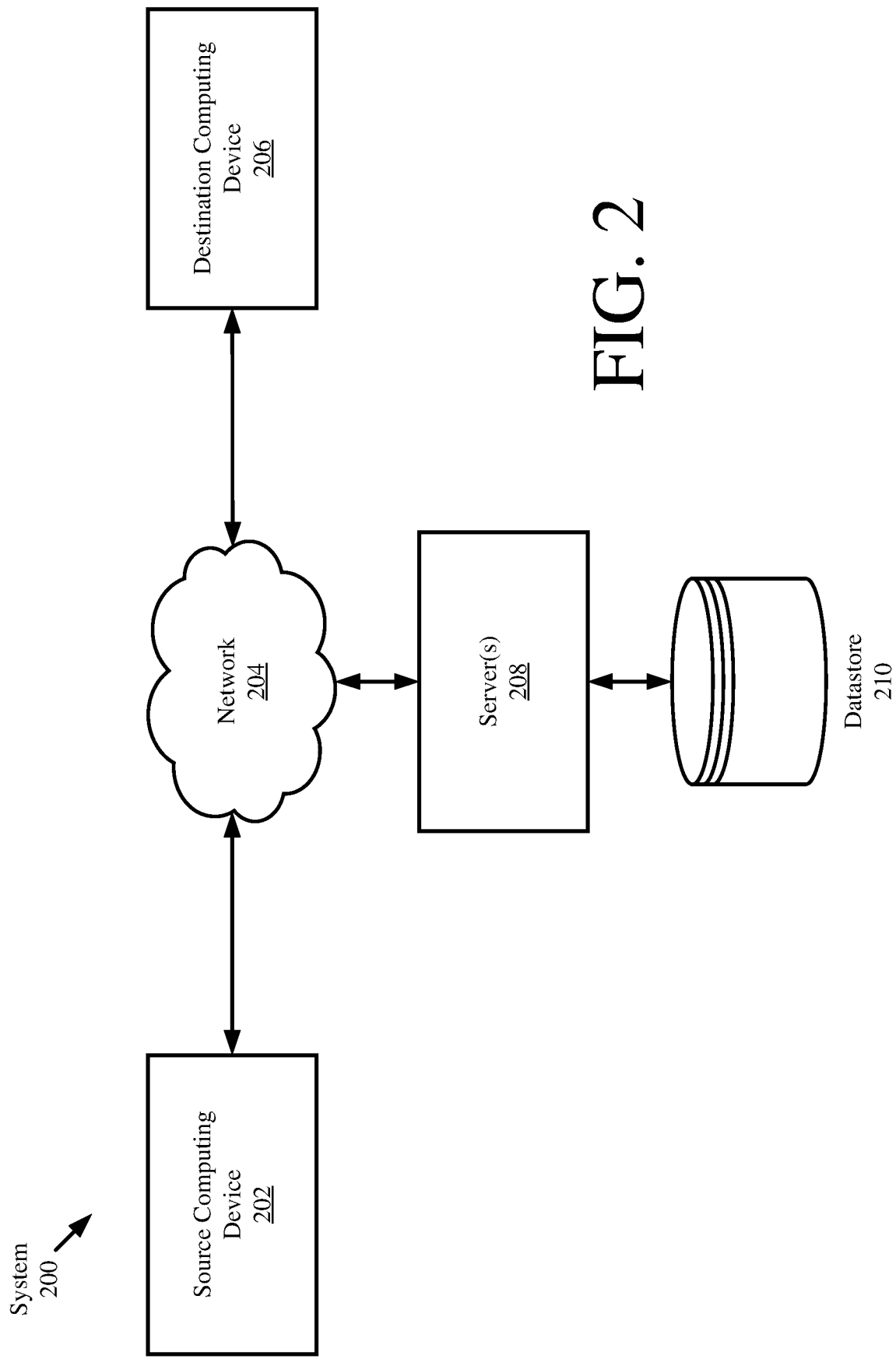
FIG. 2 is an illustration of an illustrative system implementing the present solution.

Referring now to FIG. 2, there is provided an illustration of an illustrative system 200 implementing the present solution. System 200 comprises a source computing device 202, a network 204, a destination computing device 206, a server 208 and a datastore 210. Information is communicated from the source computing device 202 to the destination computing device 206 through the network 204 (e.g., the Internet or Intranet), for example, in the form of electronic messages or documents. Viewing restrictions are assigned to each of the electronic messages, segments of information, or documents. If the viewing restrictions are satisfied for a given electronic message, segment of information or document, then the same is displayed on a screen of the destination computing device. If the viewing restrictions are not satisfied for the given electronic message, segment of information or document, then display of the same is prevented.

The determination as to whether or not the viewing restrictions are satisfied can be made by the destination computing device 206 and/or the server 208. This determination can be made based on situational awareness information collected by the destination computing device 206. The term "situational awareness", as used herein, refers to a person's and/or device's awareness of his, her or its surroundings. The situational awareness information can include, but is not limited to, information contained in captured images, information contained in captured videos, information contained in audio recordings, information specifying the destination device's location, and/or biometric information indicating the user of the destination device. The messages, viewing restrictions, and/or situational awareness information may be stored in datastore 210.

The viewing restrictions may be pre-defined or set based on user inputs. The viewing restrictions can include, but are not limited to, (1) a number of people that can view a segment of information, a message or a document, (2) a maximum number of people that can view the segment of information, message or document, (3) specific people that can view the segment of information, message or document, (4) specific people that should not view the segment of information, message or document, (5) a specific set of people that must view the segment of information, message or document together, (6) a specific location where the segment of information, message or document can be viewed, (7) no external recordings of the segment of information, message or document, (8) no external display of the segment of information, message or document, and (9) record situational awareness information while the information, message or document is being viewed. For viewing restriction purposes, individuals may be identified using email address, social network identifiers, biometric information (e.g., a facial image), voice samples, and/or a numeric identifier.

To verify that viewing restriction (1) (i.e., a number of people that can view a segment of information, message or document) is satisfied, the destination computing device 206 captures situational awareness information that is useful for detecting the number of individuals attempting to view the information, message or document. This situational awareness information includes, but is not limited to, an image, a video and/or sound recording. In the image/video scenarios, facial recognition software and/or person recognition software is used to detect a number of individuals shown in the image/video. In the sound recording scenarios, the audio analysis software is used to determine a number of individuals heard in the sound recording.

In order to verify that viewing restriction (2) (i.e., a maximum number of people that can view the information, message or document at one or more viewing times) is satisfied, the destination computing device 206 collects situational awareness information that is useful for determining whether the number of people attempting to view the information, message or document exceeds a maximum number of people allowed to view the information, message or document. The situational awareness information includes, but is not limited to, images, videos and/or sound recordings. In the image/video scenarios, facial recognition software and/or person recognition software is used to detect a number of individuals shown in the image/video. In the sound recording scenarios, the audio analysis software is used to determine a number of individuals heard in the sound recording. The results of the image, video and/or sound recording analysis is(are) then used to determine a total number of individuals that have viewed the information, message or document. A running total number of the number of people who have viewed the information, message or document at the same and/or different times is tracked by the destination computing device 206 and/or server 208. The running total number is compared to a threshold value to determine if a maximum number of people allowed to view the information, message or document has been exceeded. If so, then further viewing of the information, message or document is restricted or prevented.

In order to verify that viewing restriction (3) (i.e., specific people that can view the information, message or document) is satisfied, the destination computing device 206 collects situational awareness information that is useful for determining the identities of individuals attempting to view the information, message or document. The situational awareness information includes, but is not limited to, images, videos, sound recordings, and biometric data. In the image/video scenarios, facial recognition software and/or person recognition software is used to identify one or more individuals shown in the image/video. In the sound recording scenarios, the audio analysis software is used to identify one or more individuals heard in the sound recording. In the biometric data scenarios, the biometric data is analyzed to identify one or more individuals associated therewith.

The source computing device 202 can also provide a viewing restriction that only individuals identified in a certain person's contact list or friend list on a social network can view the information, message or document. In this case, the destination computing device 206 and/or server 208 is provided permission and access to the certain person's contact list or friend list on a social network. The information, message or document is displayed by the destination computing device 206 when a detected individual is identified in the contact list or friend list.

In order to verify that viewing restriction (4) (i.e., specific people that should not view the information, message or document) is satisfied, the destination computing device 206 collects situational awareness information that is useful for determining if an undesirable or unauthorized individual is attempting to view the information, message or document. The situational awareness information includes, but is not limited to, images, and sound recordings. Viewing of the information, message or document is restricted or prevented when a person identified from the image(s) or sound recording(s) is associated with the viewing restriction (4).

In order to verify that viewing restriction (5) (i.e., a specific set of people that must view the information, message or document together) is satisfied, the destination computing device 206 collects situational awareness information that is useful for determining the identities of individuals attempting to view the information, message or document. The situational awareness information includes, but is not limited to, images, sound recordings, and biometric data. The information, message or document is output only when all of the people of the set are identified from the situational awareness information.

In order to verify that viewing restriction (6) (i.e., a specific location where the information, message or document can be viewed) is satisfied, the destination computing device 206 collects situational awareness information that is useful for determining the location where the second computing device is accessing the information, message or document. The situational awareness information includes, but is not limited to, images, sound recordings, location data (e.g., GPS data), IP address(es) and/or cell tower location(s). The information, message or document is output only when the location determined based on the situational awareness information matches the location identified in the viewing restriction information.

In order to verify that viewing restriction (7) (i.e., no external recordings of the information are allowed) is satisfied, the destination computing device 206 collects situational awareness information that is useful for determining the presence of recording devices that can be used to record the information, message or document. The situational awareness information includes, but is not limited to, audio, images and/or videos. The images and/or videos are processed to detect any recording device (e.g., a camera) shown therein. Known object recognition techniques can be used here to detect target objects. The information, message or document is output when no target objects are detected in the images and/or videos.

In order to verify that viewing restriction (8) (i.e., no external display of the information, message or document) is satisfied, the destination computing device 206 detects when an external projection and/or display sharing mechanism is enabled. The information, message or document is output only when the external projection and/or display sharing mechanism is disabled.

In order to verify that viewing restriction (9) (i.e., record situational awareness information while the information, message or document is being viewed) is satisfied, the destination computing device 206 collects situational awareness information while the information, message or document is being output. The situational awareness information can include, but is not limited to, images, videos, sound recordings, location data, and/or destination computing device operating information including a list of connected peripherals. The information, message or document is output only when all recoding mechanisms are enabled and usable. If any one of the recording mechanisms (e.g., camera, microphone, GPS device, etc.) is disabled or otherwise unusable, then output of the information, message or document is restricted or prevented.

In view of the forgoing, the present solution provides a means for a sender to choose who can view information, messages, and/or documents. This may be done by linking social media accounts to information, messages, and/or documents. The linking allows the system 200 to identify who should be granted access to the information, messages, and/or documents. Once the information, messages and/or documents is received from the source computing device 202, a camera of the destination computing device may be activated. The activated camera captures a picture of the recipient or user of the destination computing device. This picture is compared to one or more pictures on a webpage of the linked social media account (e.g., a Facebook page). Access to the information, message or document is granted if the person identified in the recipient's picture matches (at least by a certain degree such as 75% or more) the person identified in a picture on the webpage of the linked social media account. If a match does not exist, then the recipient's picture may be sent to the source computing device and displayed to the sender. The sender is then prompted as to whether access to the information, message or document should be granted to the person shown in the recipient's picture.

The present solution provides a means for a sender to choose the number of people who can view the information, message or document. Once this information is provided to the destination computing device 206, a camera thereof is activated. The camera capture at least one image and/or a video showing any people in proximity to the destination computing device. The image(s) and/or video(s) is(are) analyzed to detect faces therein using facial recognition software. Facial recognition software is well known in the art, and therefore will not be described herein. Any known or to be known facial recognition software can be used herein without limitation. The detected faces are then counted to determine the number of people attempting to view the information, message or document. If the correct number of people are present, then access to the information, message or document is granted. If more than the allowed number of people are present, then the sender is provided an opportunity to permit access to the onlookers.

The present solution provides a means for a sender to choose a location where the information, message or document can be accessed and viewed. Once this information is provided to the destination computing device 206, a location device thereof is activated (e.g., a GPS device). If the destination computing device's location is the chosen location, then access to the information, message or document is granted. If the destination computing device's location is not the chosen location, then the sender is provided an opportunity to permit access despite the fact that the viewing restriction is not satisfied or met.

The present solution provides a means for a sender to choose the type of environment in which the information, message or document can be viewed. For example, the sender can choose to have access granted to the information, message or document when the destination computing device 206 is not located in a relatively loud or noisy environment (e.g., a bar, concert, etc.). When this sender selection is communicated to the destination computing device, a microphone thereof is activated so that an audio recording is acquired. If the audio recording comprises relatively loud sounds or noise (e.g., music, etc.), then access to the information, message or document is denied.

Figure 3:
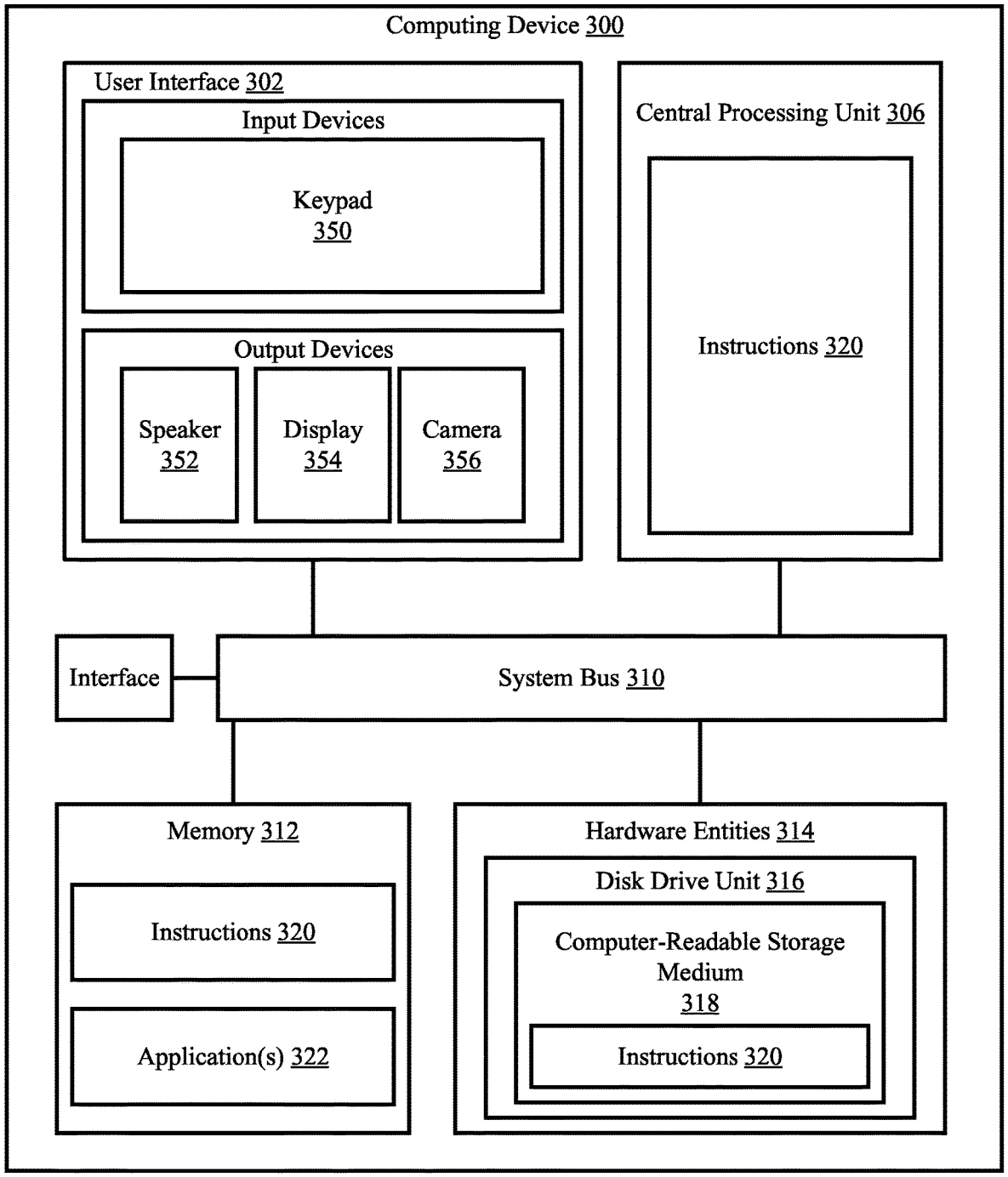
FIG. 3 is a block diagram of an illustrative computing device.

Referring now to FIG. 3, there is provided a detailed block diagram of an example architecture for a computing device 300. Source computing device 202, destination computing device 206 and/or server 208 of FIG. 3 may be the same as or substantially similar to computing device 300. As such, the following discussion of computing device 300 is sufficient for understanding components 202, 206, 208 of FIG. 2.

Notably, the computing device 300 may include more or less components than those shown in FIG. 3. However, the components shown are sufficient to disclose an illustrative embodiment implementing the present solution. The hardware architecture of FIG. 3 represents one embodiment of a representative computing device configured to facilitate restricted message viewing. As such, the computing device 300 of FIG. 3 implements at least a portion of a method for ensuring privacy in online information sharing in accordance with the present solution.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a CPU 306, a system bus 310, a memory 312 connected to and accessible by other portions of computing device 300 through system bus 310, and hardware entities 314 connected to system bus 310. The user interface can include input devices (e.g., a keypad 350) and output devices (e.g., speaker 352, a display 354, and/or camera 356), which facilitate user-software interactions for controlling operations of the computing device 300.

At least some of the hardware entities 314 perform actions involving access to and use of memory 312, which can be a RAM, a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

In some scenarios, the hardware entities 314 include an electronic circuit (e.g., a processor) programmed for facilitating privacy in online information sharing. In this regard, it should be understood that the electronic circuit can access and run a software application 322 installed on the computing device 300. The software application 322 is generally operative to facilitate verification of viewing restrictions and/or the display of information, messages and/or documents when viewing restrictions are verified. Other functions of the software application 322 will become apparent as the discussion progresses.

Figure 4:
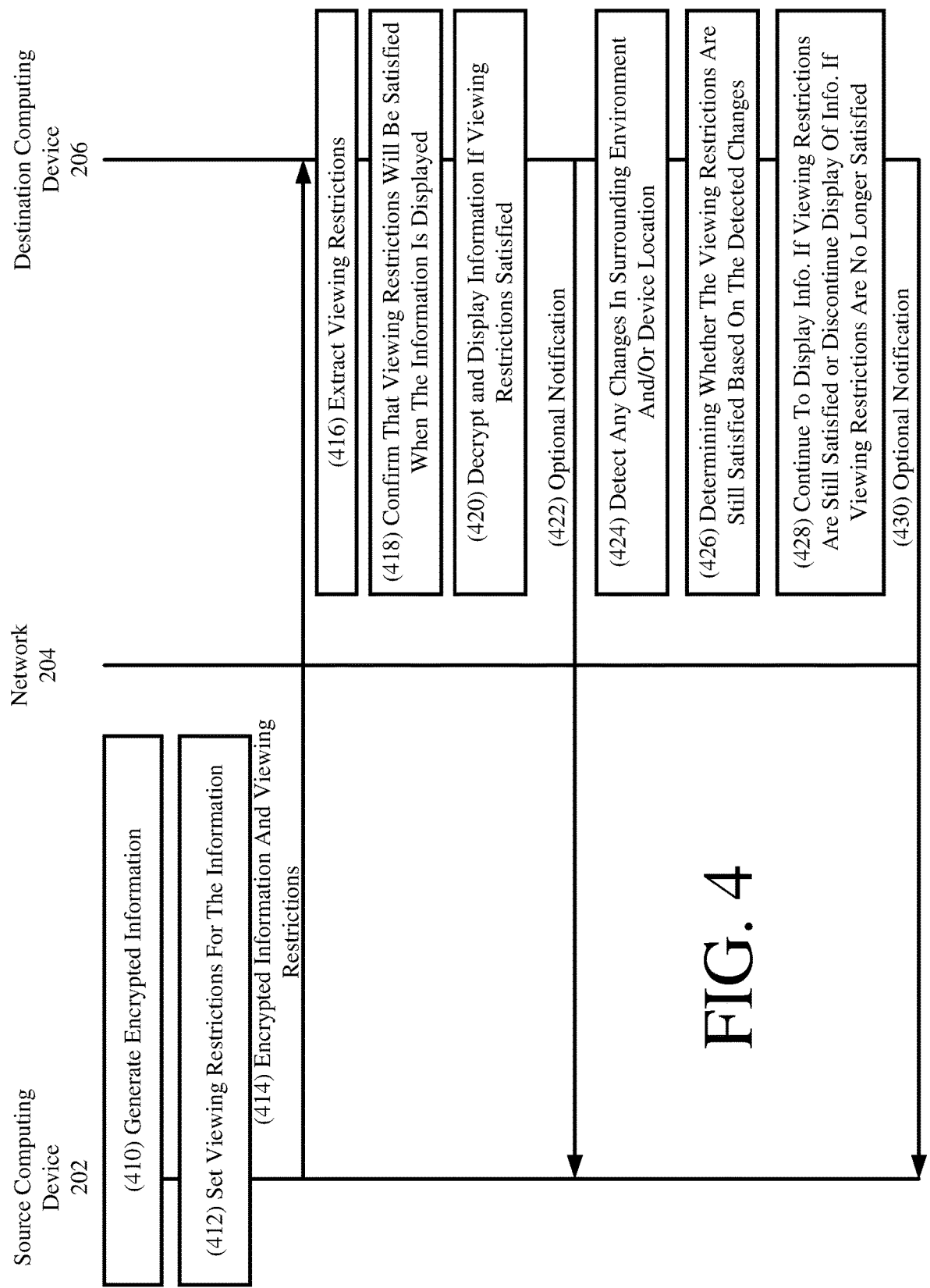
FIG. 4 is a message flow for the system shown in FIG. 2.

Referring now to FIG. 4, there is provided a message flow for the system 200. As shown in block 410, the source computing device 202 generates encrypted information (e.g., a message or document) based on user inputs. The user inputs can include, but are not limited to, textual and/or numerical inputs entered via keyboard key depressions. Methods for encrypting information are well known in the art, and therefore will not be described herein. Any known or to be known method for encrypting information can be used herein without limitation.

Next in block 412, viewing restrictions are set for the information. The viewing restrictions can be set based on a pre-defined viewing restrictions and/or based on user inputs. The viewing restrictions can include, but are not limited to, (1) a number of people that can view the information, (2) a maximum number of people that can view the information, (3) specific people that can view the information, (4) specific people that should not view the information, (5) a specific set of people that must view the information together, (6) a specific location where the information can be viewed, (7) no external recordings of the information, (8) no external display of the information, and (9) record situational awareness information while the information is being viewed. Viewing restrictions for a message can be stored in a database. The receiving device can retrieve restrictions from the database based on message identifier. Alternatively, viewing restrictions may also be embedded in the message.

As shown by arrow 414, the encrypted information and viewing restrictions are communicated from the source computing device 202 to the destination computing device 206 via network 204. In block 416, the viewing restrictions are extracted from a received signal. The destination computing device 206 then performs operations in 418 to confirm that the viewing restrictions will be satisfied when the information is displayed.

This confirmation can be achieved by: collecting situational awareness information; and analyzing the situational awareness information to determine whether the viewing restriction is satisfied. For example, destination computing device 206 can capture image(s), capture video(s), record sound, obtain location information, and/or obtain biometric information. The image(s) and/or video(s) are analyzed to detect and/or identify individuals shown therein. The audio recording is analyzed to detect speech and identify individuals associated with the detected speech. The location information is analyzed to determine a current location of the destination computing device 206. The biometric information is analyzed to determine one or more individuals identities.

The results of the image, video, audio recording, location information and/or biometric information analysis are compared against parameters of the viewing restrictions to determine if match(es) exist therebetween. For example, confirmation is made that viewing restriction (1) is satisfied when the number of individuals specified by the results of the image, video, audio recording, and/or biometric information analysis for a single viewing attempt is equal to or is less than the number of people specified by the viewing restriction (i.e., the number of people that can view the information). Confirmation is made that viewing restriction (2) is satisfied when the number of individuals specified by the results of the image, video, audio recording, and/or biometric information analysis for one or more viewing attempts is less than or equal to the maximum number of people specified by the viewing restriction. Confirmation is made that viewing restriction (3) is satisfied when each individuals identity specified by the results of the image, video, audio recording, and/or biometric information analysis for a single viewing attempt matches a person's identity specified by the viewing restriction or a list associated with the viewing restriction. Confirmation is made that viewing restriction (4) is satisfied when each individuals identity specified by the results of the image, video, and/or audio recording does not match a person's identity specified by the list of people who should not view the information. Confirmation is made that viewing restriction (5) is satisfied when a set of individuals identified via the analysis of image(s), video(s) and/or audio recording(s) for a single viewing attempt matches the set of individuals specified by the viewing restriction. Confirmation is made that viewing restriction (6) is satisfied when a geographic location specified by location information for the destination computing device matches the geographic location specified by the viewing restriction. Confirmation is made that viewing restriction (7) is satisfied when results of image and/or video analysis indicate that there are no target objects (e.g., recording devices) in the surrounding environment of the destination computing device. Confirmation is made that viewing restriction (8) is satisfied when the destination computing device detects that the external projection or display sharing mechanisms are disabled. Confirmation is made that viewing restriction (9) is satisfied when one or more recording devices (e.g., a camera, a microphone, etc.) of the destination computing device are enabled and usable (i.e., a camera's Field Of View ("FOV") is not blocked by an object).

If the viewing restriction(s) is(are) satisfied, then the message is decrypted and displayed on a display screen of the destination computing device 206, as shown by block 420. Methods for decrypting information are well known in the art, and therefore will not be described herein. Any known or to be known method for decrypting information can be used herein without limitation. The source computing device 202 may optionally be notified of the information's display as shown by arrow 422.

Notably, the destination computing device 206 may continue to monitor its location and/or the surrounding environment. In this regard, the destination computing device 206 may detect changes in the surrounding environment and/or device location as shown by 424, and determine whether the viewing restrictions are still satisfied based on the detected changes as shown by 426. The display of information is continued if the viewing restrictions are still satisfied and discontinued if the viewing restrictions are no longer satisfied, as shown by 428. An optional notification is provided to the source computing device 202 as shown by 430. This notification can indicate whether the viewing restrictions are or are not still satisfied, and/or whether the display of information is continued or discontinued.

Figure 5:
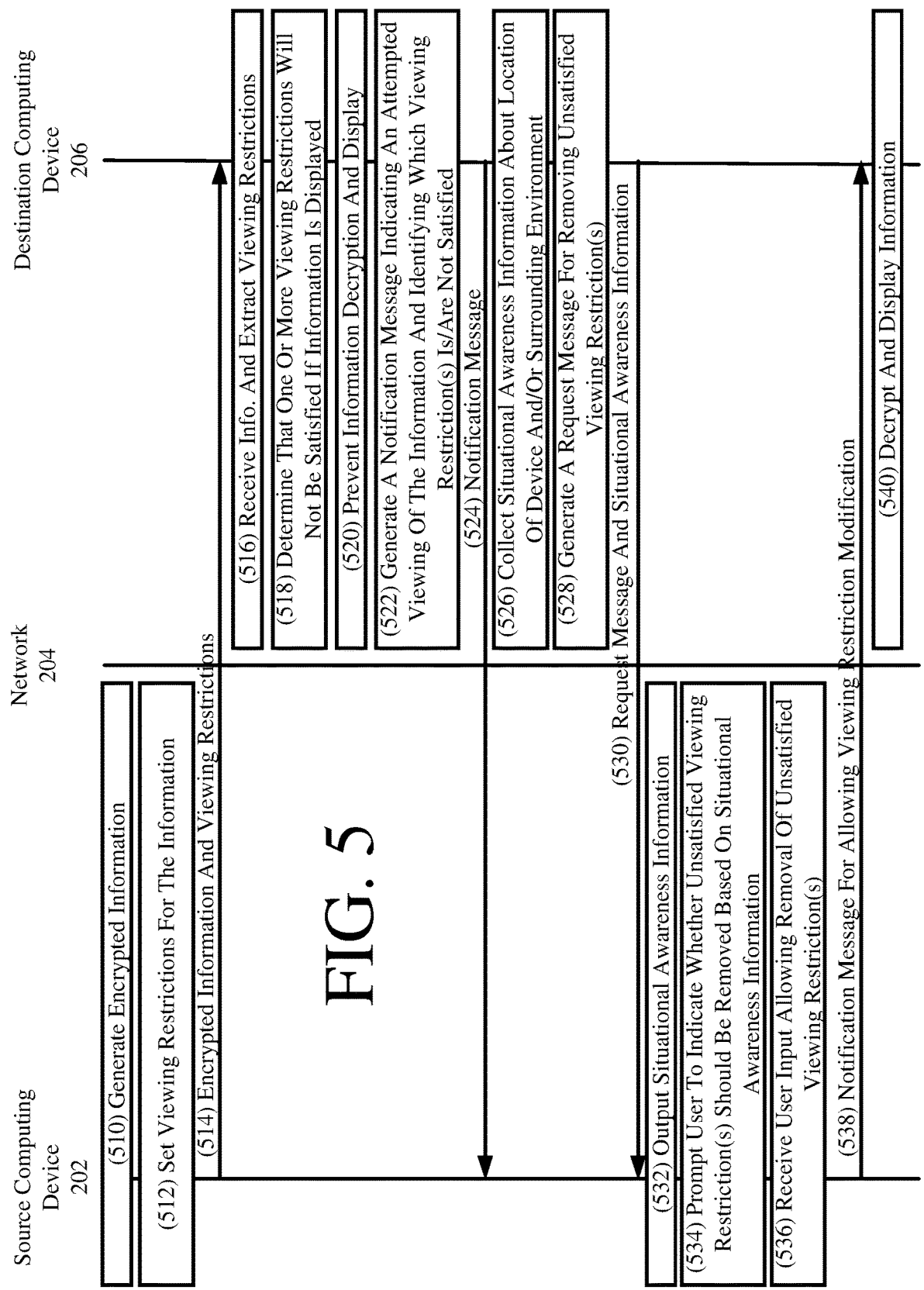
FIG. 5 is another message flow for the system shown in FIG. 2.

Referring now to FIG. 5, there is provided another message flow for the system 200. As shown in block 510, the source computing device 202 generates encrypted information (e.g., a message or document). The encrypted information can be generated based on user inputs. The user inputs can include, but are not limited to, textual and/or numerical inputs entered via keyboard key depressions. Methods for encrypting information are well known in the art, and therefore will not be described herein. Any known or to be known method for encrypting information can be used herein without limitation.

Next in block 512, viewing restrictions are set for the information. The viewing restrictions can be set based on a pre-defined viewing restrictions and/or based on user inputs. The viewing restrictions can include, but are not limited to, (1) a number of people that can view the information, (2) a maximum number of people that can view the information, (3) specific people that can view the information, (4) specific people that should not view the information, (5) a specific set of people that must view the information together, (6) a specific location where the information can be viewed, (7) no external recordings of the information, (8) no external display of the information, and (9) record situational awareness information while the information is being viewed.

As shown by arrow 514, the encrypted information and viewing restrictions are communicated from the source computing device 202 to the destination computing device 206 via network 204. In block 516, the encrypted information is received by the destination computing device 206, and the viewing restrictions are extracted from a received signal. The destination computing device 206 then performs operations in 518 to determine that one or more of the viewing restrictions will not be satisfied if the encrypted information is decrypted and displayed.

This determination is achieved by: collecting situational awareness information; and analyzing the situational awareness information to determine whether one or more viewing restrictions are not satisfied. For example, destination computing device 206 can capture image(s), capture video(s), record sound, obtain location information, and/or obtain biometric information. The image(s) and/or video(s) are analyzed to detect and/or identify individuals shown therein. The audio recording is analyzed to detect speech and identify individuals associated with the detected speech. The location information is analyzed to determine a current location of the destination computing device 206. The biometric information is analyzed to determine one or more individuals identities.

The results of the image, video, audio recording, location information and/or biometric information analysis are compared against parameters of the viewing restrictions to determine if match(es) do or do not exist therebetween. For example, a determination is made that viewing restriction (1) is not satisfied when the number of individuals specified by the results of the image, video, audio recording, and/or biometric information analysis for a single viewing attempt is greater than the number of people specified by the viewing restriction (i.e., the number of people that can view the information). A determination is made that viewing restriction (2) is not satisfied when the number of individuals specified by the results of the image, video, audio recording, and/or biometric information analysis for one or more viewing attempts is greater than the maximum number of people specified by the viewing restriction. A determination is made that viewing restriction (3) is not satisfied when each individuals identity specified by the results of the image, video, audio recording, and/or biometric information analysis for a single viewing attempt does not match any person's identity specified by the viewing restriction or a list associated with the viewing restriction. A determination is made that viewing restriction (4) is not satisfied when at least one of the individual identities specified by the results of the image, video, and/or audio recording matches a person's identity specified by the list of people who should not view the information. A determination is made that viewing restriction (5) is not satisfied when a set of individuals identified via the analysis of image(s), video(s) and/or audio recording(s) for a single viewing attempt is different than the set of individuals specified by the viewing restriction. A determination is made that viewing restriction (6) is not satisfied when a geographic location specified by location information for the destination computing device is different than the geographic location specified by the viewing restriction. A determination is made that viewing restriction (7) is not satisfied when results of image and/or video analysis indicate that there is one or more target objects (e.g., recording devices) in the surrounding environment of the destination computing device. A determination is made that viewing restriction (8) is not satisfied when the destination computing device detects that the external projection or display sharing mechanisms are enabled. A determination is made that viewing restriction (9) is not satisfied when one or more recording devices (e.g., a camera, a microphone, etc.) of the destination computing device are disabled and unusable (i.e., a camera's FOV is blocked by an object).

In response to a determination that one or more viewing restrictions are not satisfied, decryption and display of the message is prevented as shown by 520. In 522, a notification message is generated that indicates an attempted viewing of the message and indicates which viewing restriction(s) is(are) not satisfied. The notification message is communicated from the destination computing device 206 to the source computing device 202 as shown by arrow 524.

In block 526, the destination computing device 206 collects situational awareness information about the location thereof and/or the surrounding environment. A request message is generated in 528 for removing the unsatisfied viewing restriction(s). The request message and the situational awareness information are communicated from the destination computing device 206 to the source computing device 202 as shown by arrow 530.

In block 532, the situational awareness information is output from the source computing device 202. In 534, the user of the source computing device 202 is prompted to indicate whether the unsatisfied viewing restriction(s) should be removed based on the situational awareness information. If so, the source computing device 202 receives a user input in 536 allowing the removal of the unsatisfied viewing restriction(s). A notification message is then sent to the destination computing device 206 notifying the same that the unsatisfied viewing restriction(s) is(are) allowed to be removed, as shown by arrow 538. In response to this notification message, the encrypted information received in 516 is decrypted and displayed for viewing on a screen of the destination computing device 206, as shown by block 540.

Figure 6:
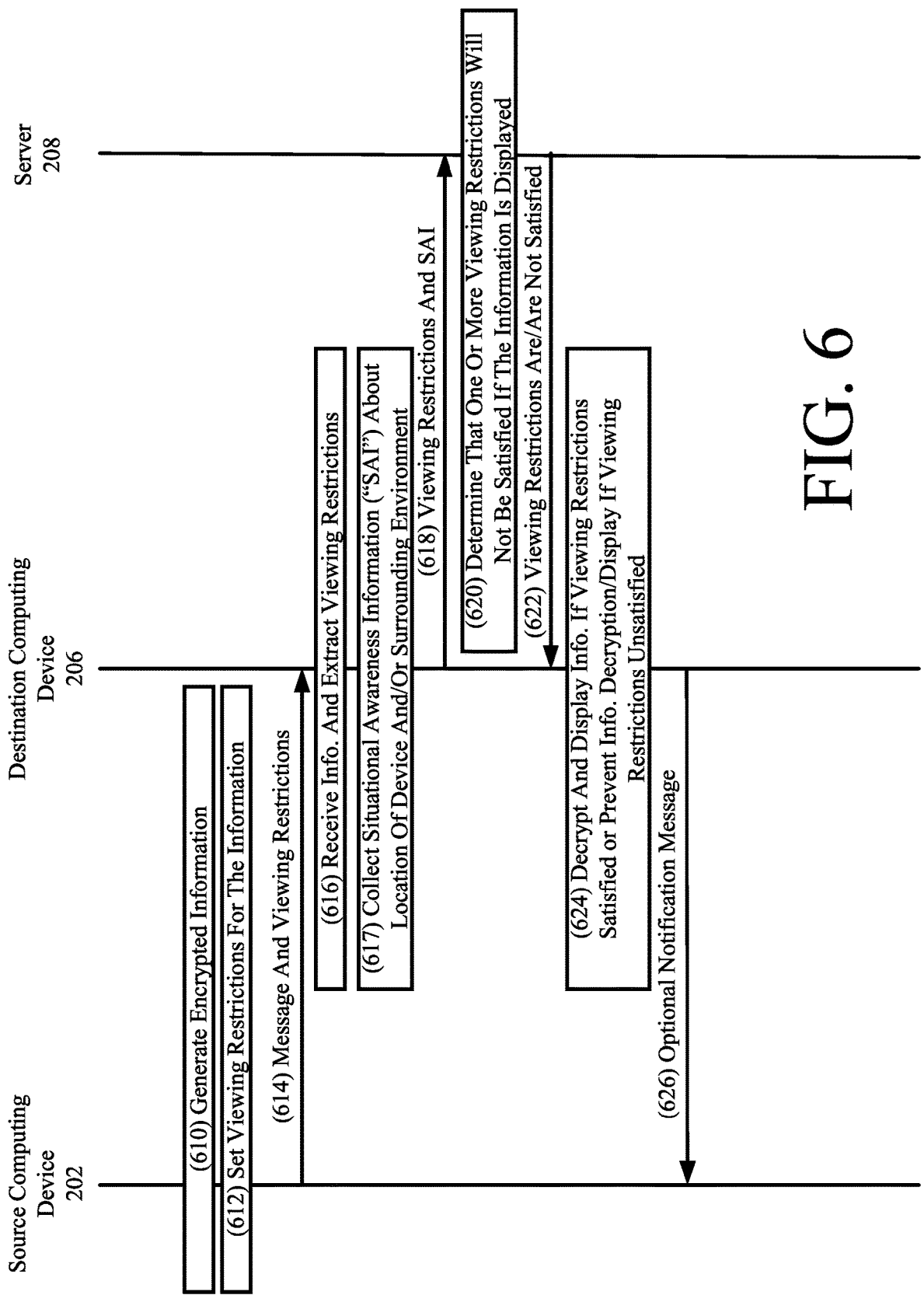
FIG. 6 is another message flow for the system shown in FIG. 2.

Referring now to FIG. 6, there is provided another message flow for system 200. This message flow covers the scenarios where one or more remote severs are used for viewing restriction processing. A destination computing device may not have the capability of checking whether viewing restrictions are satisfied. In such cases, the remote server(s) is(are) used to verify that the viewing restrictions will be satisfied if information is displayed by the destination computing device. For example, a first sever is used to perform facial recognition operations, while a second server is used to perform scene/environment recognition operations. The present solution is not limited to the particulars of this example.

The server(s) is(are) may also be used in scenarios where the source computing device is not allowed to provide all the information necessary to verify an identity of a person attempting to view the message on the destination computing device. If a restriction of the source computing device specifies the allowed viewer(s) identity(ies) using at least one social network identifier (e.g., a Facebook identifier), then the destination computing device can send collected situational awareness information and the social network identifier(s) to the server. The server performs the tasks of verifying whether facial information stored in a datastore (e.g., datastore 210 of FIG. 2) so as to be associated with the social network identifier(s) matches the facial information provided in the situational awareness information.

As shown in block 610, the source computing device 202 generates an encrypted information. The encrypted information may be generated based on user inputs. The user inputs can include, but are not limited to, textual and/or numerical inputs entered via keyboard key depressions. Methods for encrypting information are well known in the art, and therefore will not be described herein. Any known or to be known method for encrypting information can be used herein without limitation.

Next in block 612, viewing restrictions are set for the encrypted information. The viewing restrictions can be set based on a pre-defined viewing restrictions and/or based on user inputs. The viewing restrictions can include, but are not limited to, (1) a number of people that can view the information, (2) a maximum number of people that can view the information, (3) specific people that can view the information, (4) specific people that should not view the information, (5) a specific set of people that must view the information together, (6) a specific location where the information can be viewed, (7) no external recordings of the information, (8) no external display of the information, and (9) record situational awareness information while the information is being viewed.

As shown by arrow 614, the encrypted information and viewing restrictions are communicated from the source computing device 202 to the destination computing device 206. In block 616, the information is received by the destination computing device 206, and the viewing restrictions are extracted from the received signal. The destination computing device 206 then performs operations in 617 to collect situational awareness information about the device's location and/or surrounding environment. For example, the destination computing device 206 can capture image(s), capture video(s), record sound, obtain location information, and/or obtain biometric information. The viewing restrictions and situational awareness information are sent from the destination computing device 206 to the server 208 as shown by arrow 618. Notably, the server 208 can request additional situational awareness information from the destination computing device 206.

At the server 208, the situational awareness information is analyzed to determine whether or not one or more viewing restrictions will not be satisfied if the information is displayed, as shown by 620. This determination can be made in the same manner as the determination made in block 418 of FIG. 4 and/or block 518 of FIG. 5. Results of this analysis are communicated from the server 208 to the destination computing device 206, as shown by arrow 622. If the viewing restriction(s) will be satisfied, then the encrypted information is decrypted and displayed on a screen of the destination computing device in block 624. However, if the viewing restriction(s) will not be satisfied, then the decryption and display of the information are prevented in block 624. A notification message is provided to the source computing device 202 as shown by arrow 626. This notification message provides notification as to whether or not the information was decrypted and displayed and/or notification as to which viewing restrictions were not satisfied.

Figure 7A:
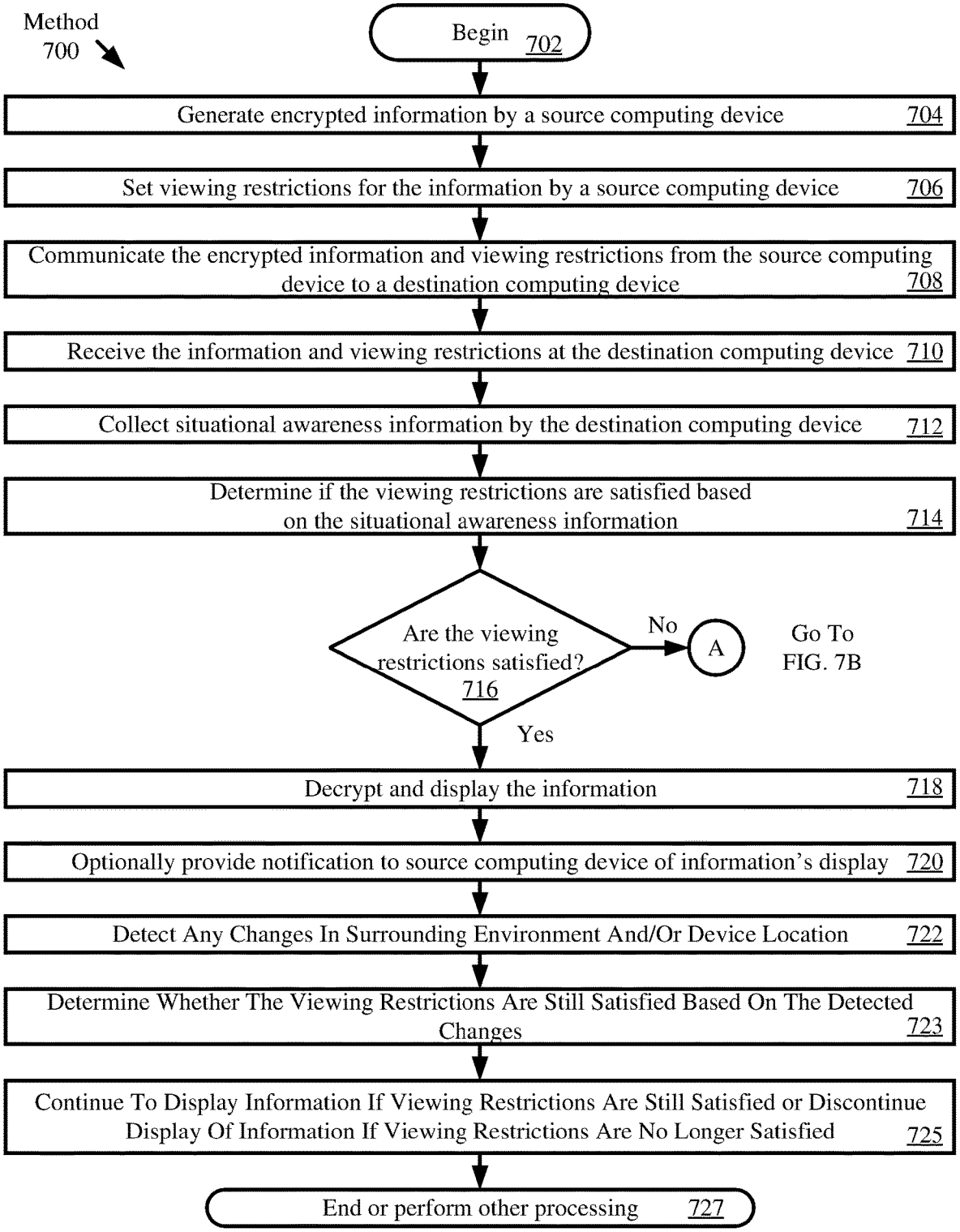
FIGS. 7A-7C (collectively referred to herein as "FIG. 7") provides a flow diagram of an illustrative method for restricting a destination computing device's output of information (e.g., messages).

Referring now to FIG. 7, there is provided a flow diagram of an illustrative method 700 for restricting a destination computing device's output of information. As shown in FIG. 7A, method 700 begins with 702 and continues with 704 where encrypted information is generated by a source computing device (e.g., source computing device 202 of FIG. 2). The encrypted information can be generated based on user inputs. The user inputs can include, but are not limited to, textual and/or numerical inputs entered via keyboard key depressions. Methods for encrypting information are well known in the art, and therefore will not be described herein. Any known or to be known method for encrypting information can be used herein without limitation.

In 706, viewing restrictions are set for the encrypted information. The viewing restrictions can be set based on pre-defined viewing restrictions and/or based on user inputs. The viewing restrictions can include, but are not limited to, (1) a number of people that can view the information, (2) a maximum number of people that can view the information, (3) specific people that can view the information, (4) specific people that should not view the information, (5) a specific set of people that must view the information together, (6) a specific location where the information can be viewed, (7) no external recordings of the information, (8) no external display of the information, and (9) record situational awareness information while the information is being viewed.

Next in 708, the encrypted information and viewing restrictions are communicated from the source computing device to a destination computing device (e.g., destination computing device 206 of FIG. 2). The destination computing device receives the encrypted information and viewing restrictions in 710. In response to the encrypted information's reception, the destination computing device collects situational awareness information as shown by 712. The situational awareness information is used in 714 by the destination computing device to determine if the viewing restrictions are satisfied.

If so [716:YES], then 718-725 are performed. 718-720 involve: decrypting the encrypted information; displaying the decrypted information on a display of the destination computing device; and providing notification to the source computing device of the information's display. 722-725 involve: detecting any changes in a surrounding environment and/or device location; determine whether the viewing restrictions are still satisfied based on the detected changes; and continue to display the information if the viewing restriction are still satisfied or discontinue display of the information if the viewing restrictions are no longer satisfied. Subsequently, 727 is performed where method 700 ends or other processing is performed.

Figure 7B:
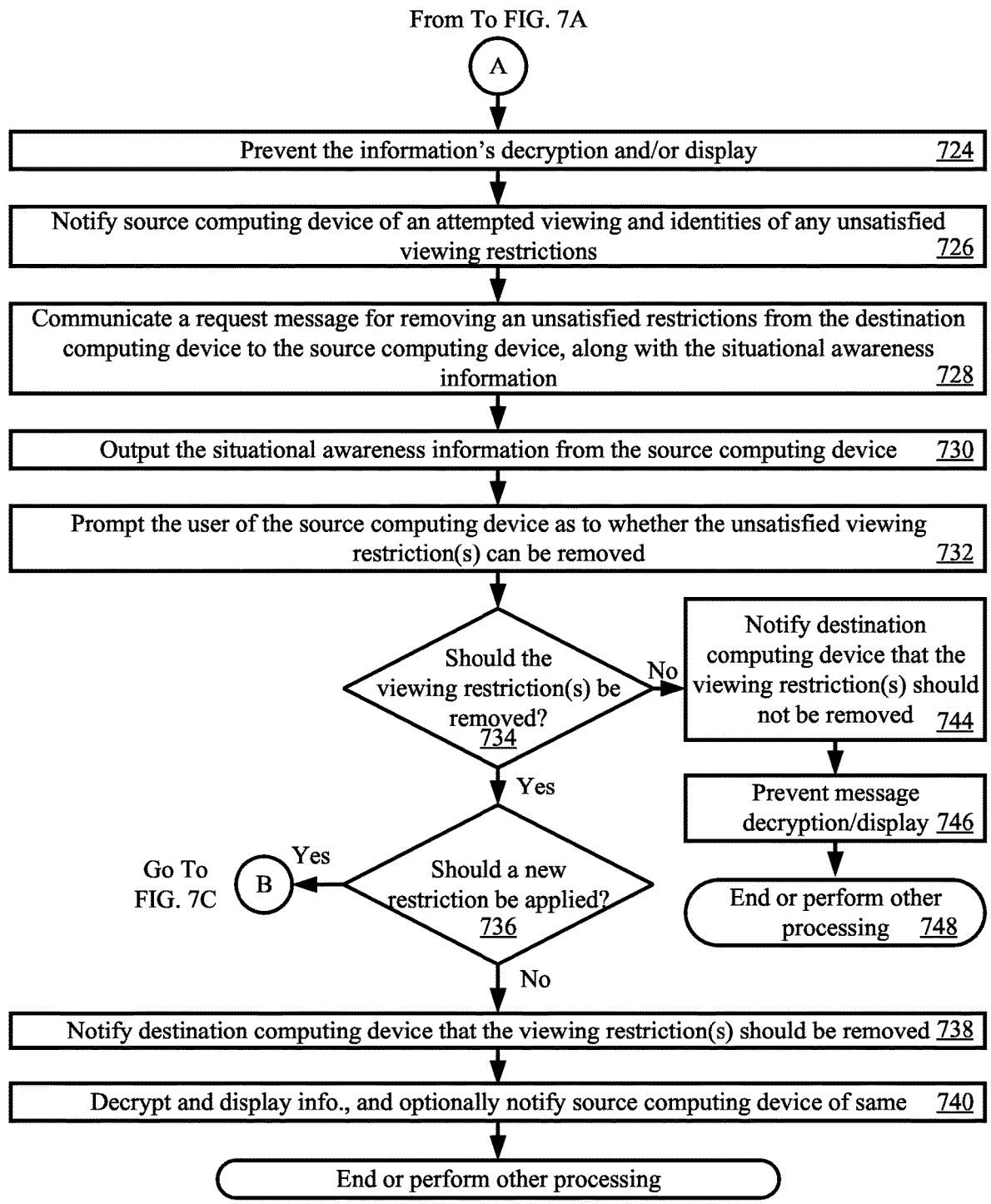

If the viewing restriction(s) is(are) not satisfied [716:NO], then method 700 continues with 724 of FIG. 7B. As shown in FIG. 7B, 724 involves preventing the decryption and display of the encrypted information. In 726, the source computing device is notified of (1) an attempted viewing and (2) the identifies of any unsatisfied viewing restrictions. A request message for removing an unsatisfied viewing restriction is communicated in 728 from the destination computing device to the source computing device. Situational awareness information is communicated along with the request message.

At the source computing device, the situational awareness information is output as shown by 730. The user of the source computing device is then prompted in 732 as to whether the unsatisfied viewing restriction(s) can be removed. If not [734:NO], then 744-746 are performed. 744-746 involve: providing a notification to the destination computing device that the viewing restriction(s) should not be removed; and preventing the decryption and display of the encrypted information. Subsequently, 748 is performed where method 700 ends or other processing is performed.

If the unsatisfied viewing restriction can be removed [734:YES], then a determination is made as to whether a new viewing restriction should be applied. If not [736:NO], then 738-740 are performed. 738-740 involve: providing notification to the destination computing device that the viewing restriction(s) should be removed; decrypting the encrypted information; displaying the decrypted information; and optionally providing notification of the same to the source computing device.

Figure 7C:
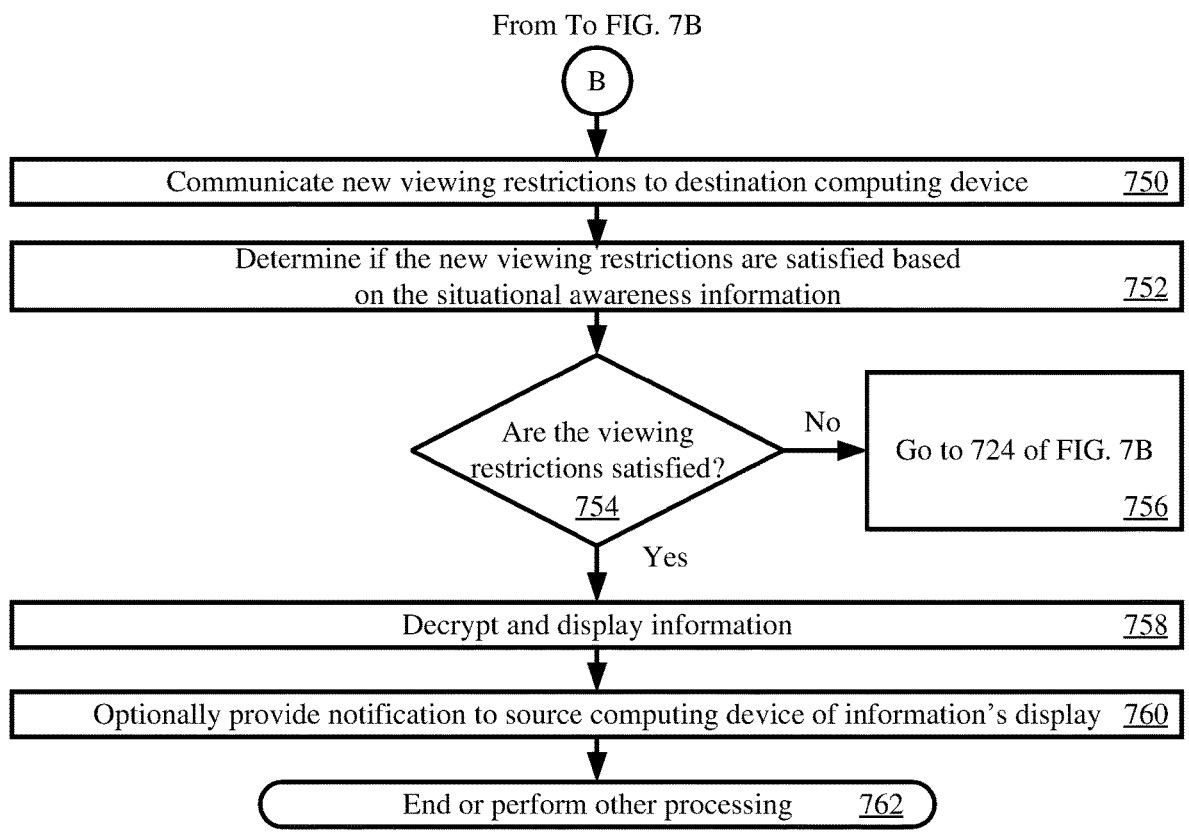

If the new viewing restriction should be applied [736:YES], then method 700 continues with 750 of FIG. 7C. As shown in FIG. 7C, 750 involves communicating new viewing restriction(s) to the destination computing device. At the destination computing device, a determination is made as to whether the new viewing restrictions are satisfied based on situational awareness information, as shown by block 752. If the new viewing restrictions are not satisfied [754:NO], then 756 is performed where method 700 goes to 724 of FIG. 7B. Alternatively, if the new viewing restrictions are satisfied [754:YES], then 758-760 are performed. 758-760 involve: decrypting the encrypted information; displaying the decrypted information on a screen of the destination computing device; providing notification of the information's display to the source computing device. Subsequently, 762 is performed where method 700 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for restricting a first computing device's output of information, comprising:
   receiving, at the first computing device, the information and at least one viewing restriction set for the information;
   collecting situational awareness information by the first computing device;
   using the situational awareness information to determine whether the at least one viewing restriction is satisfied;
   causing, by the first computing device, the at least one viewing restriction to be removed by a remote second computing device based on the situational awareness information, when a determination is made that the at least one viewing restriction is not satisfied; and
   displaying the information on a screen of the first computing device when (i) a determination is made that the at least one viewing restriction is satisfied or (ii) the at least one viewing restriction for the information has been removed by the remote second computing device.

2. The method according to claim 1, wherein the at least one viewing restriction is set based on pre-defined viewing restrictions or a user input of a second computing device.

3. The method according to claim 1, wherein the at least one viewing restriction comprises at least one of (1) people identified in a friend list of a certain person on an online social network that the first computing device or another computing device is permitted to access (2) a specific set of people that must view the information together, (3) no external recordings of the information, and (4) no external display of the information.

4. The method according to claim 1, wherein a determination is made that the at least one viewing restriction is satisfied when a number of individuals specified by results of an image, video, audio recording, and/or biometric information analysis is equal to or less than a number of people specified by the at least one viewing restriction.

5. The method according to claim 1, wherein a determination is made that the at least one viewing restriction is satisfied when each individual's identity specified by results of an image, video, audio recording or biometric information analysis matches a person's identity specified in a given friend list on a social network.

6. The method according to claim 1, wherein a determination is made that the at least one viewing restriction is satisfied when each individual's identity specified by results of an image, video, audio recording or biometric information analysis does not match a person's identity specified by a list of people who should not view information.

7. The method according to claim 1, wherein a determination is made that the at least one viewing restriction is satisfied when a plurality of individuals identified via an analysis of a single image, a single video or a single audio recording matches individuals specified by the at least one viewing restriction as those who are required to view the information together.

8. The method according to claim 1, wherein a determination is made that the at least one viewing restriction is satisfied when a geographic location or area specified by location information for the first computing device matches a geographic location or area specified by the at least one viewing restriction.

9. The method according to claim 1, wherein a determination is made that the at least one viewing restriction is satisfied when results of image or video analysis indicates that there are no inanimate objects of a given type in a surrounding environment of the first computing device.

10. The method according to claim 1, wherein a determination is made that the at least one viewing restriction is satisfied when the first computing device detects that external projection or display sharing mechanisms are disabled.

11. The method according to claim 1, wherein a determination is made that the at least one viewing restriction is satisfied when at least one recording device of the first computing device is enabled and usable.

12. The method according to claim 1, wherein the situational awareness information comprises information contained in a captured image, information contained in a captured video, information contained in an audio recording, information specifying the first computing device's location, and/or biometric information for a user of the first computing device.

13. A system, comprising:
a processor;
a non-transitory computer-readable storage medium comprising programming instructions that are configured to cause the processor to implement a method for restricting a first computing device's output of information, wherein the programming instructions comprise instructions to:
receive the information and at least one viewing restriction set for the information;
collect situational awareness information by the first computing device;
use the situational awareness information to determine whether the at least one viewing restriction is satisfied;
cause the at least one viewing restriction to be removed based on the situational awareness information, when a determination is made that the at least one viewing restriction is not satisfied; and
cause a display of the information on a screen of the first computing device when (i) a determination is made that the at least one viewing restriction is satisfied or (ii) the at least one viewing restriction has been.

14. The system according to claim 13, wherein the at least one viewing restriction is set based on pre-defined viewing restrictions or a user input of a second computing device.

15. The system according to claim 13, wherein the at least one viewing restriction comprises at least one of (1) people identified in a friend list of a certain person on an online social network that the first computing device or another computing device is permitted to access (2) a specific set of people that must view the information together, (3) no external recordings of the information, and (4) no external display of the information.

16. The system according to claim 13, wherein a determination is made that the at least one viewing restriction is satisfied when a number of individuals specified by results of an image, video, audio recording, and/or biometric information analysis is equal to or less than a number of people specified by the at least one viewing restriction.

17. The system according to claim 13, wherein a determination is made that the at least one viewing restriction is satisfied when each individual's identity specified by results of an image, video, audio recording or biometric information analysis matches a person's identity specified in a given friend list on a social network.

18. The system according to claim 13, wherein a determination is made that the at least one viewing restriction is satisfied when each individual's identity specified by results of an image, video, audio recording or biometric information analysis does not match a person's identity specified by a list of people who should not view information.

19. The system according to claim 13, wherein a determination is made that the at least one viewing restriction is satisfied when a plurality of individuals identified via an analysis of a single image, a single video or a single audio recording matches individuals specified by the at least one viewing restriction as those who are required to view the information together.

20. The system according to claim 13, wherein a determination is made that the at least one viewing restriction is satisfied when a geographic location or area specified by location information for the first computing device matches a geographic location or area specified by the at least one viewing restriction.

21. The system according to claim 13, wherein a determination is made that the at least one viewing restriction is satisfied when results of image or video analysis indicates that there are no inanimate objects of a given type in a surrounding environment of the first computing device.

22. The system according to claim 13, wherein a determination is made that the at least one viewing restriction is satisfied when the first computing device detects that external projection or display sharing mechanisms are disabled.

23. The system according to claim 13, wherein a determination is made that the at least one viewing restriction is satisfied when at least one recording device of the first computing device is enabled and usable.

24. The system according to claim 13, wherein the situational awareness information comprises information contained in a captured image, information contained in a captured video, information contained in an audio recording, information specifying the first computing device's location, and/or biometric information for a user of the first computing device.

* * * * *